(12) United States Patent
Shaffer et al.

(10) Patent No.: US 10,463,095 B2
(45) Date of Patent: *Nov. 5, 2019

(54) METHOD AND SYSTEM FOR DETECTION OF PRESENCE IN PREDEFINED LOCATION AND DELIVERY THERETO

(71) Applicant: Walmart Apollo, LLC, Bentonville, AR (US)

(72) Inventors: Jason D. Shaffer, Rogers, AR (US); Rachael Ulman, New York, NY (US); David J. Carr, Mountain View, CA (US); Richard Ramsden, Foster City, CA (US); Timothy J. Burleson, Bentonville, AR (US); Mark J. Valentine, Bentonville, AR (US); Corey L. Peach, Bella Vista, AR (US); Kuleni Gebisa, Mountain View, CA (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/256,334

(22) Filed: Jan. 24, 2019

(65) Prior Publication Data

US 2019/0150536 A1 May 23, 2019

Related U.S. Application Data

(63) Continuation of application No. 15/695,963, filed on Sep. 5, 2017, now Pat. No. 10,219,561, which is a
(Continued)

(51) Int. Cl.
*H04W 4/02* (2018.01)
*A41D 19/00* (2006.01)
(Continued)

(52) U.S. Cl.
CPC ....... *A41D 19/0055* (2013.01); *A41D 13/008* (2013.01); *A41D 19/015* (2013.01);
(Continued)

(58) Field of Classification Search
CPC ..... G06F 9/4881; H04W 4/021; H04W 4/008; H04L 67/306; H04L 69/28; H04L 43/16;
(Continued)

(56) References Cited

U.S. PATENT DOCUMENTS 9,788,157 B2  10/2017  Shaffer
2014/0066101 A1  3/2014  Lyman
(Continued)

OTHER PUBLICATIONS

"Frequently Asked Questions"; https://curbside.com/faq/, published on at least as early as Aug. 17, 2015, pp. 1-5.
(Continued)

*Primary Examiner* — Phuoc H Doan
(74) *Attorney, Agent, or Firm* — Fitch, Even, Tabin & Flannery LLP

(57) ABSTRACT

Methods and systems of detection of presence in and delivery to location are provided. A method detects a presence of a mobile device within a perimeter of a geographic region. The method searches a database to determine whether the first mobile device is associated with any existing account. Responsive to determining that the mobile device is associated with a first account, the method searches the database to determine whether there is any pending task associated with the first account. Responsive to determining that there is a pending task associated with the first account, the method transmits a first message indicating the detection of presence of the mobile device associated with the first account. The method determines that the mobile device is at least approximately at a first location of a plurality of predefined locations within the perimeter. The method trans-
(Continued)

mits information associated with the first location to the computing device.

19 Claims, 5 Drawing Sheets

Related U.S. Application Data continuation of application No. 15/236,930, filed on Aug. 15, 2016, now Pat. No. 9,788,157.

(60) Provisional application No. 62/206,131, filed on Aug. 17, 2015.

(51) Int. Cl.
| | | |
|---|---|---|
| *H04W 4/80* | (2018.01) | |
| *H04W 4/029* | (2018.01) | |
| *A41D 13/008* | (2006.01) | |
| *A41D 19/015* | (2006.01) | |
| *H04W 4/04* | (2009.01) | |
| *H04W 4/021* | (2018.01) | |
| *H04W 4/40* | (2018.01) | |

(52) U.S. Cl.
CPC . *A41D 19/01529* (2013.01); *A41D 19/01547* (2013.01); *H04W 4/021* (2013.01); *H04W 4/029* (2018.02); *H04W 4/046* (2013.01); *H04W 4/40* (2018.02); *H04W 4/80* (2018.02)

(58) Field of Classification Search
CPC .. G05D 1/0265; G05D 1/0278; G05D 1/0214; G05D 1/0221; G05D 1/0236; G05D 1/0274; G05D 1/028; G05D 1/0219; G05D 1/0234; G05D 1/0088; G05D 1/021; G05D 1/0231; G05D 1/0044; A01D 34/008; G01S 19/13
USPC ........... 718/102; 705/14.58, 26.8; 455/456.1, 455/456.3
See application file for complete search history.

(56) References Cited

U.S. PATENT DOCUMENTS

| | | |
|---|---|---|
| 2015/0199213 A1 | 7/2015 | Desai |
| 2018/0014154 A1 | 1/2018 | Shaffer |

OTHER PUBLICATIONS

U.S. Appl. No. 15/236,930; Non-Final Office Action dated Mar. 22, 2017.
U.S. Appl. No. 15/236,930; Notice of Allowance dated Jun. 5, 2017.
U.S. Appl. No. 15/695,963; Notice of Allowance dated Oct. 26, 2018.
U.S. Appl. No. 15/695,963; Office Action dated Apr. 17, 2018.
U.S. Appl. No. 15/695,963; Office Action dated Sep. 12, 2018.

METHOD AND SYSTEM FOR DETECTION OF PRESENCE IN PREDEFINED LOCATION AND DELIVERY THERETO

CROSS-REFERENCE TO RELATED APPLICATIONS

This application is a continuation of U.S. application Ser. No. 15/695,963, filed Sep. 5, 2017, which is a continuation of U.S. application Ser. No. 15/236,930, filed Aug. 15, 2016 (now U.S. Pat. No. 9,788,157), which claims the benefit of U.S. Provisional Patent Application Ser. No. 62/206,131, filed Aug. 17, 2015, which are all incorporated herein by reference.

TECHNICAL FIELD

The present disclosure generally relates to methods and systems for detection of presence of a mobile device in a predefined location and delivery of items to the predefined location.

BACKGROUND

In the context of delivery of items to consumers, home delivery of a wide variety of grocery items and online-ordered items is common. A customer may order items online via a website maintained by a merchant. Then, an employee of the merchant may take the items and deliver to the customer. However, home delivery does not work well for items that cannot be left out due to temperature conditions. Further, waiting at home for an order to arrive can counter the benefit of saving the time for visiting the store.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified.

DETAILED DESCRIPTION

Figure 1:
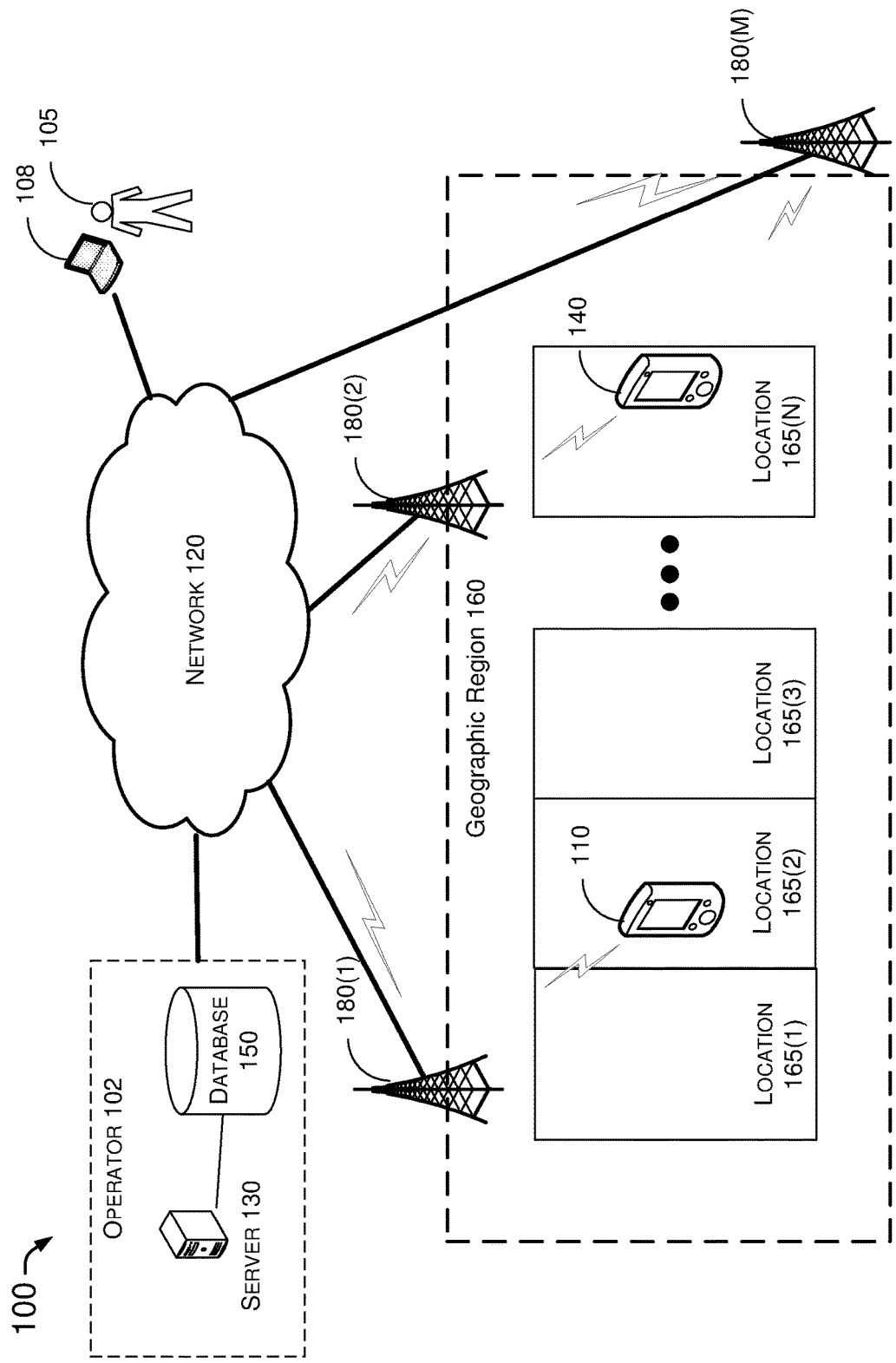
FIG. 1 is a diagram depicting an example computing environment in which example embodiments of the present disclosure may be implemented.

In the following description, reference is made to the accompanying drawings that form a part thereof, and in which is shown by way of illustrating specific exemplary embodiments in which the disclosure may be practiced. These embodiments are described in sufficient detail to enable those skilled in the art to practice the concepts disclosed herein, and it is to be understood that modifications to the various disclosed embodiments may be made, and other embodiments may be utilized, without departing from the scope of the present disclosure. The following detailed description is, therefore, not to be taken in a limiting sense.

The articles "a" and "an" are used herein to refer to one or to more than one (i.e. to at least one) of the grammatical object of the article. By way of example, "a user" means one user or more than one users. Reference throughout this specification to "one embodiment," "an embodiment," "one example," or "an example" means that a particular feature, structure, or characteristic described in connection with the embodiment or example is included in at least one embodiment of the present disclosure. Thus, appearances of the phrases "in one embodiment," "in an embodiment," "one example," or "an example" in various places throughout this specification are not necessarily all referring to the same embodiment or example. Furthermore, the particular features, structures, databases, or characteristics may be combined in any suitable combinations and/or sub-combinations in one or more embodiments or examples. In addition, it should be appreciated that the figures provided herewith are for explanation purposes to persons ordinarily skilled in the art and that the drawings are not necessarily drawn to scale.

Embodiments in accordance with the present disclosure may be embodied as an apparatus, method, or computer program product. Accordingly, the present disclosure may take the form of an entirely hardware-comprised embodiment, an entirely software-comprised embodiment (including firmware, resident software, micro-code or the like), or an embodiment combining software and hardware aspects that may all generally be referred to herein as a "circuit," "module," or "system." Furthermore, embodiments of the present disclosure may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Accordingly, the terms "computer-readable medium" and "computer-readable media" herein refer to non-transitory and tangible medium and media, respectively. Computer program code for carrying out operations of the present disclosure may be written in any combination of one or more programming languages. Such code may be compiled from source code to computer-readable assembly language or machine code suitable for the device or computer on which the code will be executed.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or merchant interaction and then scaled accordingly. A cloud model can be composed of various characteristics (e.g., on-demand self-service, broad network access, resource pooling, rapid elasticity, and measured service), service models (e.g., Software as a Service ("SaaS"), Platform as a Service ("PaaS"), and Infrastructure as a Service ("IaaS")), and deployment models (e.g., private cloud, community cloud, public cloud, and hybrid cloud).

The flow diagrams and block diagrams in the attached figures illustrate the architecture, functionality, and operation of possible implementations of systems, methods, and computer program products according to various embodiments of the present disclosure. In this regard, each block in the flow diagrams or block diagrams may represent a module, segment, or portion of code, which comprises one or more executable instructions for implementing the specified logical function(s). It will also be noted that each block of the block diagrams and/or flow diagrams, and combinations of blocks in the block diagrams and/or flow diagrams, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flow diagram and/or block diagram block or blocks.

FIG. 1 is a diagram depicting an example computing environment 100 in which example embodiments of the present disclosure may be implemented. In example computing environment 100, an operator 102 operates one or more servers, shown and referred to as a server 130 for simplicity, and one or more databases, shown and referred to as a database 150 herein for simplicity. Operator 102 in example computing environment 100 may be a business entity such as a merchant, a service provider or the like. For instance, operator 102 may be a merchant that operates an online website as well as one or more physical retail stores to sell one or more services and products, and in this case a customer may place an online order of one or more items at the website of operator 102 for pickup at one of the physical stores of operator 102. Server 130 may be communicatively coupled to access data, e.g., read from and write to, with respect to database 150. Alternatively, server 130 may include database 150 therein. Server 130 and database 150 may be communicatively coupled to a network 120 to receive information and data from and transmit information and data to network 120. For instance, server 130 may be configured to receive information from one or more computing devices, shown and referred to as a computing device 108 for simplicity, operated by one or more online users, shown and referred to as a user 105 herein for simplicity. In example computing environment 100, computing device 108 may represent a mobile device such as a smartphone, a tablet computer, a laptop computer, a notebook computer, a phablet, a desktop computer or a server that is communicatively coupled to network 102 to allow user 105 to communicate, access information and place orders via network 102. User 105 may create, via computing device 108 and network 120, an account with operator 102 by creating a user profile by storing personal information and credentials of user 105 in database 150. User 105 may also establish, place, request, create or otherwise generate one or more tasks, transactions or records with operator 102 by storing, via computing device 108 and network 120, such task(s), transaction(s) and/or record(s) in database 150. In some implementations, user 105 may use mobile device 110 in lieu of computing device 108 to perform the operations described above with respect to computing device 108.

Example computing environment 100 may also include a wireless detection system that is communicatively coupled to the server 130 via network 120. Wireless detection system may include a number of wireless communication devices 180(1)-180(M) each of which configured to function as a wireless sensor. The number M is a positive integer greater than one. Each of wireless communication devices 180(1)-180(M) may be communicatively coupled to network 120 in a wired or wireless manner. Wireless communication devices 180(1)-180(M) may be configured to communicate with one another, e.g., to transmit or receive data. Wireless communication devices 180(1)-180(M) may be disposed in and around a geographic region 160, which may include a number of predefined locations 165(1)-165(N) defined therein, where N is a positive integer greater than one. Wireless communication devices 180(1)-180(M) may be configured to form a geo-fence around geographic region 160 by forming a virtual perimeter around geographic region 160. Accordingly, one or more of wireless communication devices 180(1)-180(M) may wirelessly detect the presence of one or more mobile devices, e.g., a mobile device 110, within a perimeter of geographic region 160. One or more wireless communication devices 180(1)-180(M) may be configured to function as a radio beacon, a sonic beacon and/or a visual beacon. Any presently available technology and future-developed technology suitable for the purposes of geo-fencing and presence detection may be implemented in wireless communication devices 180(1)-180(M). The perimeter of geographic region 160 may be dynamically defined, e.g., by server 130 or the wireless detection system, on a periodic basis or in response to receiving an operator input. As a result, a size of geographic region 160 within the perimeter at a first time is different from a size of geographic region 160 within the perimeter at a second time.

In some implementations, mobile device 110 may have a mobile app, e.g., a computer program designed to run on mobile platforms such as mobile device 110, installed therein with location service turned on. The mobile app, in collaboration with software and/or hardware of mobile device 110, may be configured to determine a location of mobile device 110 in real-time or on a periodic basis. For instance, mobile device 110 may be equipped with a global positioning system (GPS) device configured to determine a location of mobile device 110 in real-time fashion or upon request by a user or the mobile app. Other technologies, such as radio frequency identification (RFID) may be utilized to detect the presence of mobile devices, e.g., mobile device 110, by wireless communication devices 180(1)-180(M). That is, the wireless detection system may be capable of detecting the presence of mobile devices using GPS information received from the detected mobile device(s), RFID signal(s) received from such mobile device(s), or a combination thereof.

The mobile app may also be configured to establish communication, e.g., wirelessly via mobile device 110, with one or more of wireless communication devices 180(1)-180(M) when mobile device 110 is near and/or within the perimeter of geographic region 160. In some implementations, the mobile app may cause mobile device 110 to provide location of mobile device 110, e.g., GPS coordinates, to one or more wireless communication devices 180(1)-180(M). Alternatively or additionally, by triangulation multiple ones of wireless communication devices 180(1)-180(M) may determine the location of mobile device 110, e.g., based on wireless signals transmitted from mobile device 110. Alternatively or additionally, a user of mobile device 110 may send a notification to operator 102 via the wireless detection system to indicate that the user (and mobile device 110) is within the perimeter of geographic region 160. For example, upon visually seeing one or more of wireless communication devices 180(1)-180(M) functioning as visual beacon(s) or upon being prompted by the mobile app via a display of mobile device 110, the user may operate the mobile app to cause mobile device 110 to transmit a signal, received by one or more of wireless communication devices 180(1)-180(M), to indicate that the user (and mobile device 110) is within the perimeter of geographic region 160.

Upon detecting the presence of mobile device 110 within geographic region 160, wireless detection system may transmit information to server 130 to indicate the detection of the presence of mobile device 110. Server 130 may search database 150 to determine whether mobile device 110 is associated with any existing account. When it is determined that mobile device 110 (and/or the user of mobile device 110) is associated with an existing account, herein referred to as "first account", server 130 may further search database 150 to determine whether there is any pending task associated with the first account. A pending task may be an action that needs to be taken by the operator 102 with respect to mobile device 110 or the user of mobile device 110. For example, a pending task may involve the operator 110 transmitting certain data or information to mobile device 110 when it is determined that mobile device 110 is within the geographic region 160 or within one of the predefined locations 165(1)-165(N). As another example, a pending task may involve the operator 110 transmitting a particular signal to mobile device 110 to trigger certain action(s) on mobile device 110, e.g., performed by a mobile app on mobile device 110, when it is determined that mobile device 110 is within the geographic region 160 or within one of the predefined locations 165(1)-165(N). As yet another example, a pending task may involve the operator 110 delivering one or more items to the spot where mobile device 110 is located when it is determined that mobile device 110 is within the geographic region 160 or within one of the predefined locations 165(1)-165(N).

Responsive to determining that there is a pending task associated with the first account, server 130 may also determine that mobile device 110 is approximately at one of the predefined locations 165(1)-165(N). For instance, upon determining that there is a pending task associated with the first account, server 130 may transmit a signal to mobile device 110, via network 120 and wireless detection system or a mobile communication system (not shown), to prompt the mobile device 110 (or the user of mobile device 110) to provide an updated location of mobile device 110. Specifically, mobile device 110 may provide updated location information, e.g., updated GPS coordinates, to server 130 or, alternatively or additionally, the user of mobile device 110 may be prompted to indicate which one of predefined locations 165(1)-165(N) at which mobile device 110 is at least approximately located, it not within, at that time. Accordingly, server 130 may receive a message from mobile device 110 to indicate the current location of mobile device 110. Alternatively or additionally, server 130 may transmit a signal to wireless detection system to cause one or more wireless communication devices 180(1)-180(M) to detect and determine an updated location of mobile device 110. The purpose for doing so is to attempt to pinpoint the current location of mobile device 110 as to which one of the predefined locations 165(1)-165(N) at which the mobile device 110 is located at the current time.

In some implementations, one or more wireless communication devices 180(1)-180(M) of the wireless detection system may track a movement of mobile device 110 within the perimeter of geographic region 160. One or more wireless communication devices 180(1)-180(M) of the wireless detection system may also determine non-movement of mobile device 110 at least approximately at one of the predefined locations 165(1)-165(N) for at least a threshold period of time, e.g., 30 seconds, 1 minute or 3 minutes. One or more wireless communication devices 180(1)-180(M) of the wireless detection system may further transmit a result of the tracking and/or determining to server 130.

In some implementations, server 130 may trigger a timer, e.g., at server 130, mobile device 110 or another computing device, to count down for a predetermined period of time, e.g., 5 minutes or another amount of time that is more or less than 5 minutes, upon determining that mobile device 110 is at least approximately at one of the predefined locations 165(1)-165(N) within the perimeter of geographic region 160. In some implementations, in triggering the timer, server 130 may transmit a signal to mobile device 110 to trigger a timer on mobile device 110.

In some implementations, one or more wireless communication devices 180(1)-180(M) of the wireless detection system may detect a presence of another mobile device, e.g., mobile device 140, within the perimeter of geographic region 160, and the wireless detection system may send a message to server 130 to indicate the detection of mobile device 140. Subsequently, server 130 may search database 150 to determine whether mobile device 140 is associated with any existing account. Responsive to determining that there is an existing account, herein referred to as "second account", server 130 may further search database 150 to determine whether there is any pending task associated with the second account.

Figure 2:
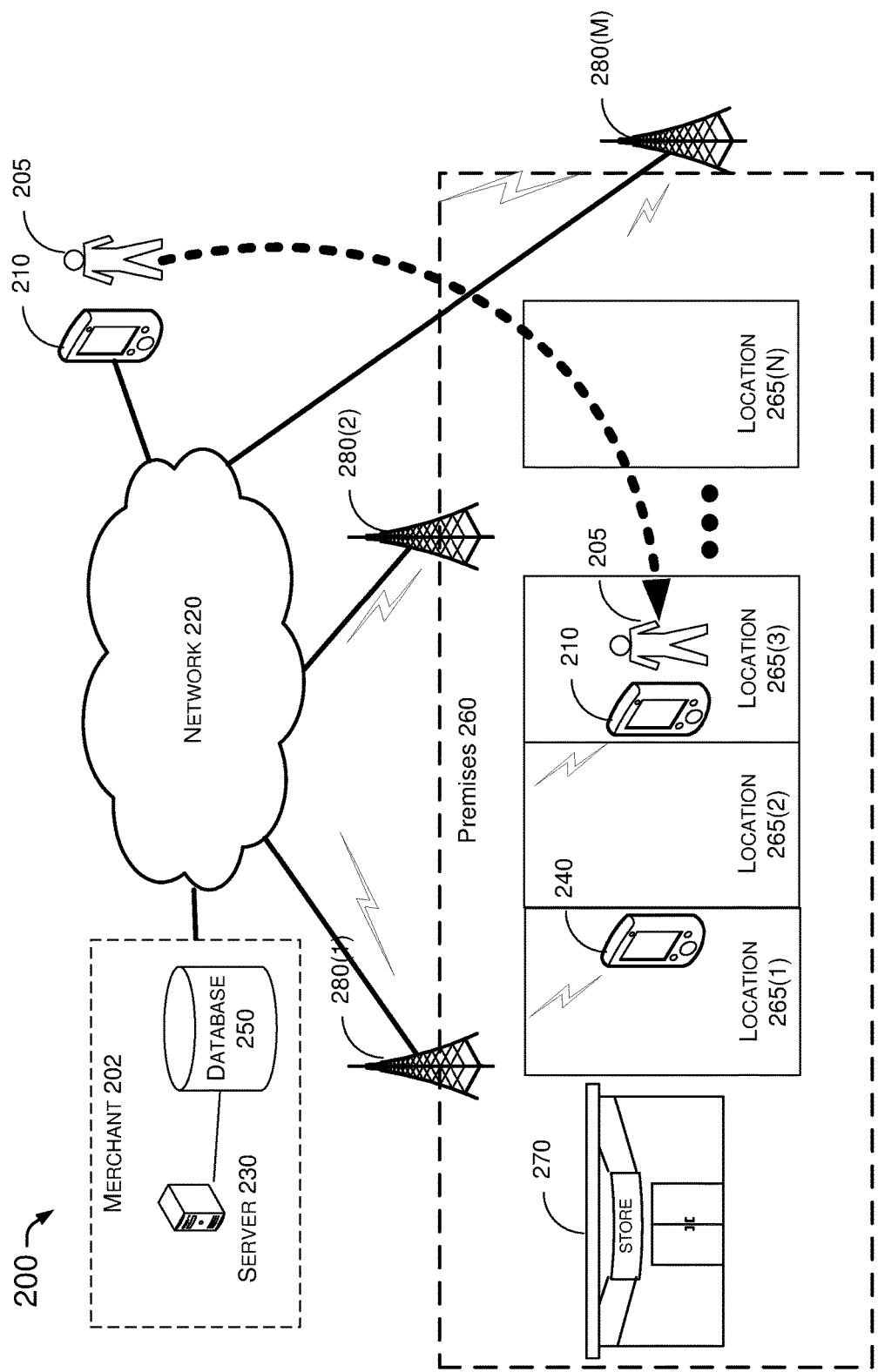
FIG. 2 is a diagram depicting an example scenario in which example embodiments of the present disclosure may be implemented.

FIG. 2 is a diagram depicting an example scenario 200 in which example embodiments of the present disclosure may be implemented. Example scenario 200 is one of many possible implementation scenarios based on example computing environment 100, and is provided solely for illustrative purpose so that those skilled in the art may better appreciate benefits and advantages provided by the present disclosure. Therefore, the scope of the present disclosure is not limited to example scenario 200.

In example scenario 200, a merchant 202 operates one or more servers, shown and referred to as a server 230 for simplicity, and one or more databases, shown and referred to as a database 250 herein for simplicity. In some embodiments, database 250 may be an integral part of server 230. Database 250 may record, store or otherwise contain therein data associated with a set of products and/or services that are available for sale at an e-commerce website hosted on web server for pickup at one or more physical stores associated with merchant 202, including physical store 270. Database 250 may also record, store or otherwise contain therein data associated with a set of products and/or services that are available for sale at physical store 270.

One or more physical stores, e.g., store 270, may be operated by, owned by, affiliated with or otherwise related to merchant 202. Each physical store is located near to or within a respective geographic region. For instance, as shown in FIG. 2, store 270 is located within or near premises 260, which includes a number of predefined locations 265(1)-265(N). Predefined locations 265(1)-265(N) may be, for example, parking spots. Merchant 202 may offer a plethora of items, or merchandise, for sale, and the items for sale may be purchased online for shipment to consumers or pickup at a local store, e.g., store 270. Database 250 may store information associated with the items for sale as well as user accounts of consumers.

Server 230 may be communicatively coupled to access data, e.g., read from and write to, with respect to database 250. Alternatively, server 230 may include database 250 therein. Server 230 and database 250 may be communicatively coupled to a network 220 to receive information and data from and transmit information and data to network 220. For instance, server 230 may be configured to receive information from one or more computing devices, shown and referred to as a mobile device 208 for simplicity, operated by one or more online users, shown and referred to as a user 205 herein for simplicity. User 205 may create, via mobile device 210 and network 220, an account with merchant 202 by creating a user profile by storing personal information and credentials of user 205 in database 250. User 205 may also establish, place, request, create or otherwise generate one or more tasks, transactions or records with merchant 202 by storing, via mobile device 210 and network 220, such task(s), transaction(s) and/or record(s) in database 250. For instance, user 205, having an account created with merchant 202, may place an order of one or more items for pickup at store 270. User 205 may schedule an appointment for pickup of the order at store 270, whether as a particular point in time, e.g., 4:30 PM on March 18, or a range of time, e.g., 4:30-5:30 PM on March 18. Accordingly, server 230 may create and store in database 250 a task for staff at store 270 to prepare and deliver the one or more items of the order for the scheduled pickup appointment.

Example scenario 200 may also include a wireless detection system that is communicatively coupled to the server 230 via network 220. Wireless detection system may include a number of wireless communication devices 280(1)-280(M) each of which configured to function as a wireless sensor. Each of wireless communication devices 280(1)-280(M) may be communicatively coupled to network 220 in a wired or wireless manner. Wireless communication devices 280(1)-280(M) may be configured to communicate with one another, e.g., to transmit or receive data. Wireless communication devices 280(1)-280(M) may be disposed in and around premises 260. Wireless communication devices 280(1)-280(M) may be configured to form a geo-fence around premises 260 by forming a virtual perimeter around premises 260. Accordingly, one or more of wireless communication devices 280(1)-280(M) may wirelessly detect the presence of one or more mobile devices, e.g., mobile device 210, within a perimeter of premises 260. One or more wireless communication devices 280(1)-280(M) may be configured to function as a radio beacon, a sonic beacon and/or a visual beacon. Any presently available technology and future-developed technology suitable for the purposes of geo-fencing and presence detection may be implemented in wireless communication devices 280(1)-280(M). The perimeter of premises 260 may be dynamically defined, e.g., by server 230 or the wireless detection system, on a periodic basis or in response to receiving an operator input. As a result, a size of premises 260 within the perimeter at a first time is different from a size of premises 260 within the perimeter at a second time.

In some implementations, mobile device 210 may have a mobile app, e.g., a computer program designed to run on mobile platforms such as mobile device 110, installed therein with location service turned on. The mobile app, in collaboration with software and/or hardware of mobile device 210, may be configured to determine a location of mobile device 210 in real-time or on a periodic basis. For instance, mobile device 210 may be equipped with a GPS device configured to determine a location of mobile device 2 in real-time fashion or upon request by a user or the mobile app. Other technologies, such as RFID may be utilized to detect the presence of mobile devices, e.g., mobile device 210, by wireless communication devices 280(1)-280(M). That is, the wireless detection system may be capable of detecting the presence of mobile devices using GPS information received from the detected mobile device(s), RFID signal(s) received from such mobile device(s), or a combination thereof.

The mobile app may also be configured to establish communication, e.g., wirelessly via mobile device 210, with one or more of wireless communication devices 280(1)-280(M) when mobile device 210 is near and/or within the perimeter of premises 260. In some implementations, the mobile app may cause mobile device 210 to provide location of mobile device 210, e.g., GPS coordinates, to one or more wireless communication devices 280(1)-280(M). Alternatively or additionally, by triangulation multiple ones of wireless communication devices 280(1)-280(M) may determine the location of mobile device 210, e.g., based on wireless signals transmitted from mobile device 210. Alternatively or additionally, a user of mobile device 210 may send a notification to merchant 202 via wireless detection system to indicate that the user (and mobile device 210) is within the perimeter of premises 260. For example, upon visually seeing one or more of wireless communication devices 280(1)-280(M) functioning as visual beacon(s) or upon being prompted by the mobile app via a display of mobile device 210, the user may operate the mobile app to cause mobile device 210 to transmit a signal, received by one or more of wireless communication devices 280(1)-280(M), to indicate that the user (and mobile device 210) is within the perimeter of premises 260.

Upon detecting the presence of mobile device 210 within premises 260, wireless detection system may transmit information to server 230 to indicate the detection of the presence of mobile device 210. Server 230 may search database 250 to determine whether mobile device 210 is associated with any existing account. When it is determined that mobile device 210 (and/or the user of mobile device 210) is associated with an existing account, herein referred to as "first account", server 230 may further search database 250 to determine whether there is any pending task associated with the first account. Responsive to determining that there is a pending task associated with the first account, server 230 may transmit a first message to one or more computing devices associated with store 270 to indicate the detecting of the presence of the mobile device 210 which is associated with the first account. This way, staff at store 270 may be put on notice that user 205 is here to pick up the one or more items of the online order. Server 230 may also determine that mobile device 210 is approximately at one of the predefined locations 265(1)-265(N), and transmit information associated with the determined location as one of the predefined locations 265(1)-265(N) to the one or more computing devices associated with store 270. For instance, upon determining that there is a pending task associated with the first account, server 230 may transmit a signal to mobile device 210, via network 220 and the wireless detection system or a mobile communication system (not shown), to prompt the mobile device 210 (or the user of mobile device 210) to provide an updated location of mobile device 210. Specifically, mobile device 210 may provide updated location information, e.g., updated GPS coordinates, to server 230 or, alternatively or additionally, the user of mobile device 210 may be prompted to indicate which one of predefined locations 265(1)-265(N) at which mobile device 210 is at least approximately located, it not within, at that time. Accordingly, server 230 may receive a message from mobile device 210 to indicate the current location of mobile device 210. Alternatively or additionally, server 230 may transmit a signal to wireless detection system to cause one or more wireless communication devices 280(1)-280(M) to detect and determine an updated location of mobile device 210. The purpose for doing so is to attempt to pinpoint the current location of mobile device 210 as to which one of the predefined locations 265(1)-265(N) at which the mobile device 210 is located at the current time.

In some implementations, one or more wireless communication devices 280(1)-280(M) of the wireless detection system may track a movement of mobile device 210 within the perimeter of premises 260. One or more wireless communication devices 280(1)-280(M) of the wireless detection system may also determine non-movement of mobile device 210 at least approximately at one of the predefined locations 265(1)-265(N) for at least a threshold period of time, e.g., 30 seconds, 1 minute or 3 minutes. One or more wireless communication devices 280(1)-280(M) of the wireless detection system may further transmit a result of the tracking and/or determining to server 230.

In some implementations, server 230 may trigger a timer, e.g., at server 230, mobile device 210 or at least one computing device of the one or more computing devices associated with store 270, to count down for a predetermined period of time, e.g., 5 minutes or another amount of time that is more or less than 5 minutes, upon determining that mobile device 210 is at least approximately at one of the predefined locations 265(1)-265(N) within the perimeter of premises 260. In some implementations, in triggering the timer, server 230 may transmit a signal to mobile device 210 to trigger a timer on mobile device 210. The countdown of time may indicate to user 205 or staff of store 270 the remaining amount of time within which the one or more items of the online order will be or should be delivered to user 205 at the particular location, e.g., one of predefined locations 265(1)-265(N).

In some implementations, one or more wireless communication devices 280(1)-280(M) of the wireless detection system may detect a presence of another mobile device, e.g., mobile device 240, within the perimeter of premises 260, and the wireless detection system may send a message to server 230 to indicate the detection of mobile device 240. Subsequently, server 230 may search database 250 to determine whether mobile device 240 is associated with any existing account. Responsive to determining that there is an existing account, herein referred to as "second account", server 230 may further search database 250 to determine whether there is any pending task associated with the second account. Server 230 may transmit a third message to the one or more computing devices associated with store 270 to indicate that there is no pending task associated with the second account.

In some implementations, server 230 may search database 250 to identify one or more other existing accounts and determine whether the one or more other existing accounts are associated with mobile device 210 (or user 205). Upon determining that the one or more other existing accounts are associated with mobile device 210 (or user 205), server 230 may store in database 250 an indication that the one or more other existing accounts are associated to mobile device 210 (or user 205). In some implementations, each of the one or more other existing accounts may share at least one common attribute with the first account, e.g., name, address, credit card number and/or phone number. For instance, the first account and the one or more other existing accounts may belong to members of the same family or household, and thus may share the same address, last name and/or phone number.

In some implementations, server 230 may search database 250 to identify one or more other mobile devices, including mobile device 240. Server 230 may store in database 250 an indication that the one or more other mobile devices are associated to the first account. For instance, mobile device 210 may be operated by or otherwise associated with user 205, who is the head of his household, and mobile device 240 may be operated by or otherwise associated with the wife of user 205. In some implementations, each of the one or more other mobile devices may share at least one common attribute with the first mobile device. Following the previous example, mobile device 240 and mobile device 210 may be registered under the same owner, e.g., user 205, or registered under or otherwise associated with users having the same address.

In some implementations, the pending task may include fulfillment of an order placed by user 205 who is associated with the first account. The first message, sent by server 230, may trigger the one or more computing devices associated with store 270 to perform operations in connection with the fulfillment of the order. For instance, upon receiving the first message, at least one computing device associated with store 270 may signal the staff of store 270 to start preparation for fulfillment of the order, e.g., by a message displayed on screen, an audible signal played by the computing device, or a message sent to pager(s) worn by the staff.

Advantageously, according to embodiments of the present disclosure, staff at store 270 may be automatically informed of the arrival of a customer, e.g., user 205, upon determination of the presence of the customer within premises 260, e.g., by using geo-fencing. The customer does not need to initiate a mobile app other than to leave on or turn on the location service(s) on mobile device 210. Moreover, staff of store 270 may also be automatically informed of the parking spot in which the customer is parked, e.g., by using beacon technology. The customer does not need to initiate the mobile app other than to leave on or turn on the location service(s) on mobile device 210.

Thus, by implementing embodiments of the present disclosure in example scenario 200, staff at store 270 may be notified that a specific customer, e.g., user 205, has arrived inside premises 260 which is associated with store 270, so that the staff may begin to assemble the order before the customer parks (assuming the customer drove here). One or more databases associated with merchant 202, including database 250, may be cross referenced to confirm that the customer has an existing, yet-to-be-fulfilled order before notification to staff of store 270 is sent. According to the present disclosure, multiple accounts may be associated to a single mobile device, and multiple devices, e.g., mobile device 210 and mobile device 240, may be associated to a single account, e.g., that of user 205. Staff of store 270 may be notified what parking spot the customer chose or is parked in. The countdown may start as soon as the parking spot of the customer is determined, which may be notified by the customer or determined by the wireless detection system. Staff of store 270 may also be notified of the parking spot/location of a customer who does not have an active order pending.

Figure 3:
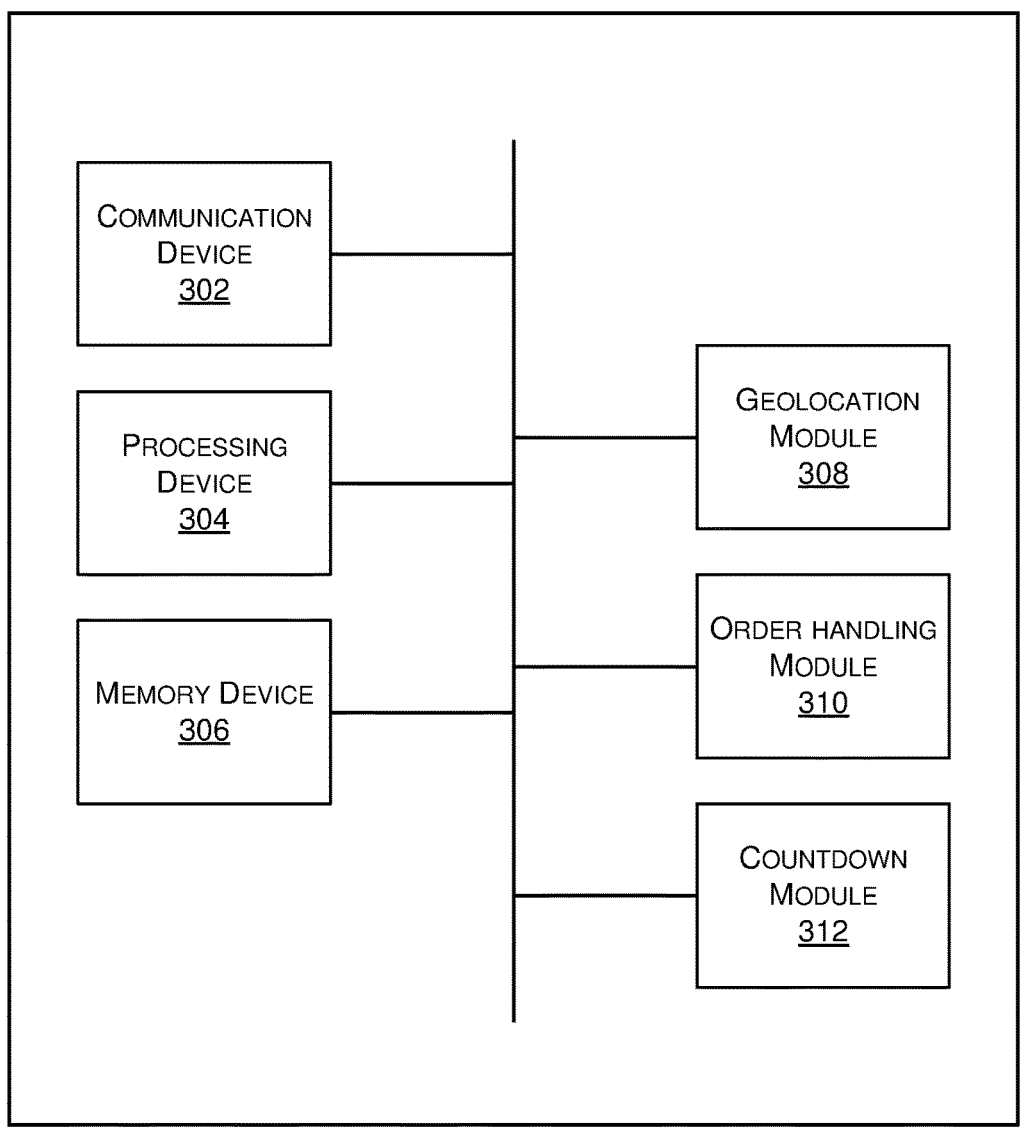
FIG. 3 is a block diagram depicting an embodiment of a computing apparatus in accordance with the present disclosure.

FIG. 3 is a block diagram depicting an embodiment of a computing apparatus 300 in accordance with the present disclosure. Computing apparatus 300 may perform various functions related to embodiments of the present disclosure. In some embodiments, computing apparatus 300 may be implemented in or as server 130 in example computing environment 100 and/or server 230 in example scenario 200. In some embodiments, computing apparatus 300 may be implemented as one or more computing devices that cooperatively implement the functions described herein. Computing apparatus 300 may include a communication device 302, one or more processors (shown as a processing device 304 in FIG. 3), and a memory device 306. Communication module 302 may allow computing apparatus 300 to communicate with other networks, systems, servers and/or computing devices. Processing device 304 may execute one or more sets of instructions to implement the functionality provided by computing apparatus 300. Memory device 306 may store the one or more sets of instructions executable by processing device 304 as well as other data used by processing device 304.

Computing apparatus 300 may also include a geolocation module 308, an order handling module 310, and a countdown module 312. Each of geolocation module 308, order handling module 310, and countdown module 312 may perform one or more functions under the control of processing device 304. Although geolocation module 308, order handling module 310 and countdown module 312 are depicted in FIG. 3 as discrete modules separate from the processing device 304, in various implementations one or more of geolocation module 308, order handling module 310 and countdown module 312 may be an integral part of processing device 304. For simplicity, a task or function performed by any of geolocation module 308, order handling module 310 and countdown module 312 may be described as if such task or function is performed by processing device 304.

Geolocation module 308 may be configured to receive geographic or locational information about mobile device 110 or 210, e.g., from the wireless detection system via network 120 or 220. The received geographic or locational information may be used by processing device 304 in determining the location of mobile device 110 or 210.

Order handling module 310 may be configured to receive information from consumers, e.g., including user 105 and user 205, who place online orders for one or more items, e.g., products and/or services offered for sale by merchant 202. Order handling module 310 may store such online order(s) in a database, e.g., database 150 or 250.

Countdown module 312 may be configured to trigger a timer to countdown for a predefined amount of time. The timer may be within countdown module 312, processing device 304 or a remote device, e.g., mobile device 110, mobile device 210 and/or the one or more computing devices associated with store 270.

Processing device 304 may be configured to search a database, e.g., database 150 or 250, to determine whether a first mobile device, e.g., mobile device 110 or 210, is associated with any existing account, e.g., that of user 105 or 205. Processing device 304 may, responsive to determining that the first mobile device is associated with an existing first account, search the database to determine whether there is any pending task associated with the first account. Processing device 304 may, responsive to determining that there is a pending task associated with the first account, transmit a first message to one or more computing devices, e.g., computing device(s) associated with store 270, to indicate the detecting of the presence of the first mobile device associated with the first account. Processing device 304 may also determine that the first mobile device is at approximately a first location of a plurality of pre-defined locations within the perimeter. Processing device 304 may further transmit information associated with the first location to the one or more computing devices.

In some implementations, in determining that the first mobile device is at approximately the first location of the plurality of pre-defined locations within the perimeter, processing device 304 may be configured to receive a second message from the first mobile device indicating that the first mobile device is at approximately the first location.

In some implementations, processing device 304 may be further configured to transmit a signal to the first mobile device to trigger a timer on the first mobile device to count down for a predetermined period of time upon determining that the first mobile device is at approximately the first location of the plurality of pre-defined locations within the perimeter.

In some implementations, processing device 304 may be further configured to perform operations comprising: receiving a signal from the a wireless detection system indicative of detection of a presence of a second mobile device within the perimeter of the geographic region; searching the database to determine that the second mobile device is associated with a second account; searching the database to determine that there is no pending task associated with the second account; and transmitting a third message to the one or more computing devices to indicate that there is no pending task associated with the second account.

In some implementations, processing device 304 may be further configured to perform operations comprising: searching the database to identify one or more other existing accounts or one or more other mobile devices; and storing in the database an indication that the one or more other existing accounts are associated to the first mobile device or an indication that the one or more other mobile devices are associated to the first account.

In some implementations, processing device 304 may be further configured to dynamically define the perimeter of the geographic region on a periodic basis or in response to receiving an operator input such that a size of an area of the geographic region within the perimeter at a first time is different from a size of an area of the geographic region within the perimeter at a second time.

Figure 4:
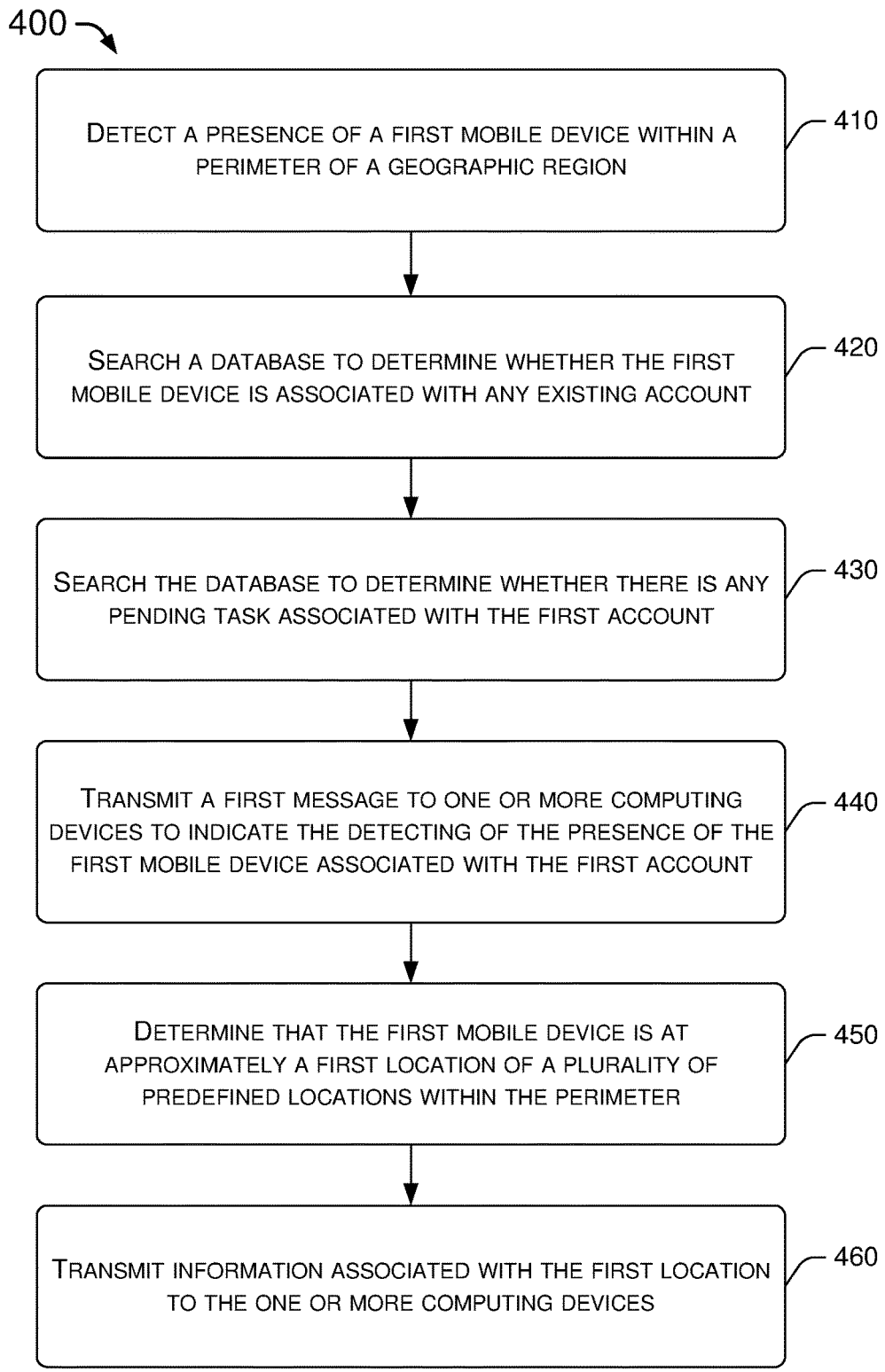
FIG. 4 is a flowchart diagram of an example process for detection of presence of one or more mobile devices in a geographic region in accordance with the present disclosure.

FIG. 4 illustrates an example process 400 for detection of presence of one or more mobile devices in a geographic region in accordance with the present disclosure. Example process 400 may include one or more operations, actions, or functions such as 410, 420, 430, 440, 450 and 460. Although illustrated as discrete blocks, various blocks may be divided into additional blocks, combined into fewer blocks, or eliminated, depending on the desired implementation. Example process 400 may be implemented by the system shown in example computing environment 100 and/or the system shown in example scenario 200.

At 410, example process 400 may involve a wireless detection system (e.g., wireless communication devices 180(1)-180(N) or 280(1)-280(N)) detecting a presence of a first mobile device (e.g., mobile device 110) within a perimeter of a geographic region (e.g., geographic region 160).

At 420, example process 400 may involve a processing device (e.g., processing device 304 of computing apparatus 300 implemented as server 130 or 230), which is communicatively coupled to the wireless detection system, searching a database (e.g., database 150 or 250) to determine whether the first mobile device is associated with any existing account.

At 430, responsive to determining that the first mobile device is associated with an existing first account, example process 400 may involve the processing device searching the database to determine whether there is any pending task associated with the first account.

At 440, responsive to determining that there is a pending task associated with the first account, example process 400 may involve the processing device transmitting a first message to one or more computing devices to indicate the detecting of the presence of the first mobile device associated with the first account. In example scenario 200 for example, processing device 304 of computing apparatus 300, implemented as server 230, may transmit the first message to one or more computing devices associated with store 270 to notify the detection of the presence of mobile device 210 of user 205, to whom the first account may be associated. These one or more computing devices may be, for example, mobile devices (e.g., pagers, tablets, personal digital assistants, smartphones, laptop computers, notebook computers), desktop computers and/or servers. This would make staff at store 270 aware of the arrival of user 205 at premises 260 for pickup so that the staff could start gathering the one or more items for delivery to user 205.

At 450, example process 400 may also involve the processing device determining that the first mobile device is at least approximately at a first location of a plurality of predefined locations within the perimeter.

At 460, example process 400 may further involve the processing device transmitting information associated with the first location to the one or more computing devices.

In some implementations, the operation of determining that the first mobile device is at least approximately at the first location of the plurality of predefined locations within the perimeter may involve the processing device receiving a second message from the first mobile device indicating that the first mobile device is at least approximately at the first location.

In some implementations, the operation of determining that the first mobile device is at least approximately at the first location of the plurality of predefined locations within the perimeter may involve the wireless detection system performing operations including: tracking a movement of the first mobile device within the perimeter; determining, by the wireless detection system, non-movement of the first mobile device at least approximately at the first location for at least a threshold period of time; and transmitting, by the wireless detection system, a result of at least one of the tracking or the determining to the processing device.

In some implementations, example process 400 may also involve the processing device triggering a timer to count down for a predetermined period of time upon determining that the first mobile device is at least approximately at the first location of the plurality of predefined locations within the perimeter.

In some implementations, the operation of triggering the timer may involve transmitting a signal to the first mobile device to trigger a timer on the first mobile device.

In some implementations, example process 400 may involve the wireless detection system detecting a presence of a second mobile device within the perimeter of the geographic region. Example process 400 may also involve the processing device searching the database to determine that the second mobile device is associated with a second account. Example process 400 may further involve the processing device searching the database to determine that there is no pending task associated with the second account. Example process 400 may additionally involve the processing device transmitting a third message to the one or more computing devices to indicate that there is no pending task associated with the second account.

In some implementations, example process 400 may involve the processing device searching the database to identify one or more other existing accounts. Example process 400 may also involve the processing device storing in the database an indication that the one or more other existing accounts are associated to the first mobile device.

In some implementations, each of the one or more other existing accounts may share at least one common attribute with the first account.

In some implementations, example process 400 may involve the processing device searching the database to identify one or more other mobile devices. Example process 400 may also involve the processing device storing in the database an indication that the one or more other mobile devices are associated to the first account.

In some implementations, each of the one or more other mobile devices may share at least one common attribute with the first mobile device.

In some implementations, example process 400 may involve the processing device dynamically defining the perimeter of the geographic region on a periodic basis or in response to receiving an operator input such that a size of the geographic region within the perimeter at a first time is different from a size of the geographic region within the perimeter at a second time.

In some implementations, the operation of detecting the presence of the first mobile device within the perimeter of the geographic region may include detecting the presence of the first mobile device using global positioning system (GPS) information received from the first mobile device, a radio frequency identification (RFID) signal received from the first mobile device, or a combination thereof.

In some implementations, the pending task may include fulfillment of an order placed by a user associated with the first account. The one or more computing devices may be associated with a facility near or within the perimeter. The first message may trigger the one or more computing devices to perform operations in connection with the fulfillment of the order.

Figure 5:
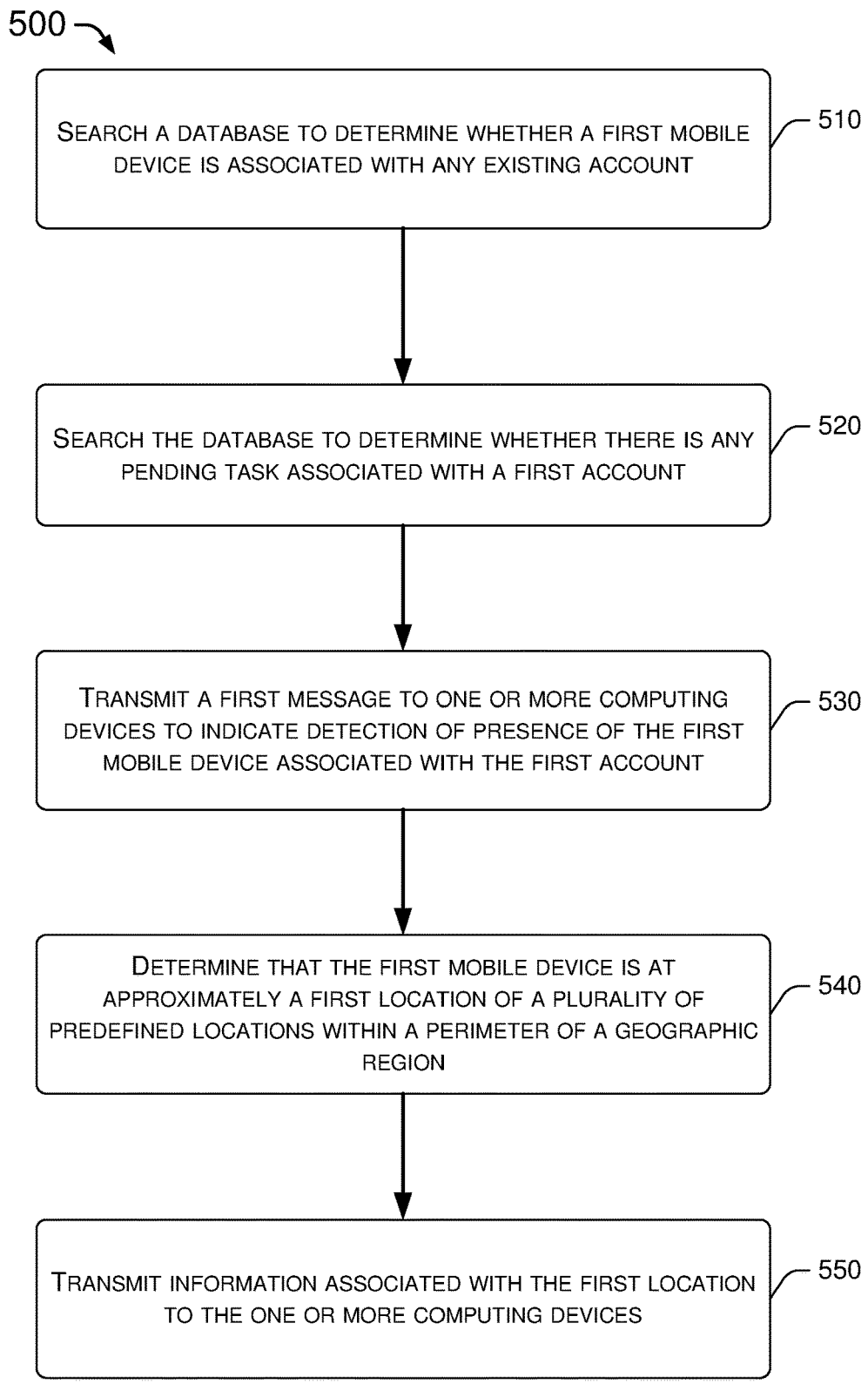
FIG. 5 is a flowchart diagram of another example process for detection of presence of one or more mobile devices in a geographic region in accordance with the present disclosure.

FIG. 5 illustrates another example process 500 for detection of presence of one or more mobile devices in a geographic region in accordance with the present disclosure. Example process 500 may include one or more operations, actions, or functions such as 510, 520, 530, 540 and 550. Although illustrated as discrete blocks, various blocks may be divided into additional blocks, combined into fewer blocks, or eliminated, depending on the desired implementation. Example process 500 may be implemented by one or more processors including, for example, one or more processors of server 130 and/or server 200 or processing device 304. For illustrative purposes, the operations described below are performed by processing device 304 of computing apparatus 300.

At 510, example process 500 may involve processing device 304 searching the database to determine whether the first mobile device is associated with any existing account.

At 520, responsive to determining that the first mobile device is associated with an existing first account, example process 500 may involve processing device 304 searching the database to determine whether there is any pending task associated with the first account.

At 530, responsive to determining that there is a pending task associated with the first account, example process 500 may involve processing device 304 transmitting a first message to one or more computing devices to indicate the detecting of the presence of the first mobile device associated with the first account.

At 540, example process 500 may involve processing device 304 determining that the first mobile device is at least approximately at a first location of a plurality of predefined locations within the perimeter.

At 550, example process 500 may involve processing device 304 transmitting information associated with the first location to the one or more computing devices.

In some implementations, in determining that the first mobile device is at least approximately at the first location of the plurality of predefined locations within the perimeter, example process 500 may involve processing device 304 receiving a second message from the first mobile device indicating that the first mobile device is at least approximately at the first location.

In some implementations, the wireless detection system may be configured to perform operations including: tracking a movement of the first mobile device within the perimeter; determining non-movement of the first mobile device at least approximately at the first location for at least a threshold period of time; and transmitting a result of at least one of the tracking or the determining to the processing device.

In some implementations, example process 500 may involve processing device 304 transmitting a signal to the first mobile device to trigger a timer on the first mobile device to count down for a predetermined period of time upon determining that the first mobile device is at least approximately at the first location of the plurality of predefined locations within the perimeter.

In some implementations, example process 500 may involve processing device 304 performing operations including: receiving a signal from the a wireless detection system indicative of detection of a presence of a second mobile device within the perimeter of the geographic region; searching the database to determine that the second mobile device is associated with a second account; searching the database to determine that there is no pending task associated with the second account; and transmitting a third message to the one or more computing devices to indicate that there is no pending task associated with the second account.

In some implementations, example process 500 may involve processing device 304 performing operations including: searching the database to identify one or more other existing accounts or one or more other mobile devices; and storing in the database an indication that the one or more other existing accounts are associated to the first mobile device or an indication that the one or more other mobile devices are associated to the first account.

In some implementations, example process 500 may involve processing device 304 dynamically defining the perimeter of the geographic region on a periodic basis or in response to receiving an operator input such that a size of the geographic region within the perimeter at a first time is different from a size of the geographic region within the perimeter at a second time.

Although the present disclosure is described in terms of certain embodiments, other embodiments will be apparent to those of ordinary skill in the art, given the benefit of this disclosure, including embodiments that do not provide all of the benefits and features set forth herein, which are also within the scope of this disclosure. It is to be understood that other embodiments may be utilized, without departing from the scope of the present disclosure.

The invention claimed is:

1. A method, comprising:
providing a plurality of wireless detection devices arranged to form a wireless detection system around a geographic region where a retail store is located by forming a virtual perimeter around the geographic region where the retail store is located;
detecting, by the wireless detection devices of the wireless detection system, a presence of a first mobile device of a customer of the retail store within the virtual perimeter of the geographic region where the retail store is located;
providing an electronic database, the electronic database storing data representing all existing accounts of customers of the retail store and including an identification of one or more mobile devices associated with one or more of the existing accounts of the customers, the electronic database further storing data representing all pending tasks associated with orders placed by the customers of the existing accounts;
searching, by a processing device communicatively coupled to the wireless detection system, the data stored in the electronic database to determine whether the first mobile device detected by the wireless detection system is stored in the electronic database in association with any existing account;
responsive to determining, by the processing device, that the first mobile device is associated with an existing first account, the processing device searching the electronic database to determine whether there is data stored in the electronic database indicative of any pending task associated with the first account;
responsive to determining, by the processing device, based on a search of the data stored in the electronic database, that there is a pending task associated with the first account, the processing device transmitting a first message to one or more computing devices of staff at the retailer store, the first message notifying the staff at the retail store of the detecting of the presence of the first mobile device associated with the first account within the virtual perimeter of the geographic region where the retail store is located and signaling the staff at the retail store to start preparation for fulfillment of the order;
determining, by the processing device, that the first mobile device is at least approximately at a first location of a plurality of predefined locations within the virtual perimeter of the geographic region where the retail store is located; and
transmitting, by the processing device, information associated with the first location to the one or more computing devices.

2. The method of claim 1, where the determining that the first mobile device of the customer of the retail store is at least approximately at the first location of the plurality of predefined locations within the virtual perimeter comprises receiving, by the processing device, a second message from the first mobile device of the customer of the retail store indicating that the first mobile device of the customer of the retail store is at least approximately at the first location.

3. The method of claim 1, where the determining that the first mobile device of the customer of the retail store is at least approximately at the first location of the plurality of predefined locations within the virtual perimeter comprises:
tracking, by the wireless detection system, a movement of the first mobile device of the customer of the retail store within the virtual perimeter;

determining, by the wireless detection system, non-movement of the first mobile device of the customer of the retail store at least approximately at the first location for at least a threshold period of time; and transmitting, by the wireless detection system, a result of at least one of the tracking or the determining to the processing device.

4. The method of claim 1, further comprising:
triggering, by the processing device, a timer to count down for a predetermined period of time upon determining that the first mobile device of the customer of the retail store is at least approximately at the first location of the plurality of predefined locations within the virtual perimeter.

5. The method of claim 4, wherein the triggering the timer comprises transmitting a signal to the first mobile device of the customer of the retail store to trigger a timer on the first mobile device of the customer of the retail store.

6. The method of claim 1, further comprising:
detecting, by the wireless detection system, a presence of a second mobile device of a second customer of the retail store within the virtual perimeter of the geographic region where the retail store is located;
searching, by the processing device, the electronic database to determine that the second mobile device of the second customer of the retail store is associated with a second account;
searching, by the processing device, the electronic database to determine that there is no pending task associated with the second account; and
transmitting, by the processing device, a third message to the one or more computing devices to indicate that there is no pending task associated with the second account.

7. The method of claim 1, further comprising:
searching, by the processing device, the electronic database to identify one or more other existing accounts; and
storing, by the processing device, in the electronic database an indication that the one or more other existing accounts are associated to the first mobile device of the customer of the retail store.

8. The method of claim 7, wherein each of the one or more other existing accounts shares at least one common attribute with the first account.

9. The method of claim 1, further comprising:
searching, by the processing device, the electronic database to identify one or more other mobile devices of other customers of the retail store; and
storing, by the processing device, in the electronic database an indication that the one or more other mobile devices are associated to the first account.

10. The method of claim 9, wherein each of the one or more other mobile devices of the other customers of the retail store shares at least one common attribute with the first mobile device of the customer of the retail store.

11. The method of claim 1, further comprising:
dynamically defining, by the processing device, the virtual perimeter of the geographic region where the retail store is located on a periodic basis or in response to receiving an operator input such that a size of the geographic region within the virtual perimeter at a first time is different from a size of the geographic region within the virtual perimeter at a second time.

12. The method of claim 1, wherein the detecting the presence of the first mobile device within the virtual perimeter of the geographic region where the retail store is located comprises detecting the presence of the first mobile device using global positioning system (GPS) information received from the first mobile device, a radio frequency identification (RFID) signal received from the first mobile device, or a combination thereof.

13. A system, comprising:
a plurality of wireless detection devices arranged to form a wireless detection system around a geographic region where a retail store is located by forming a virtual perimeter around the geographic region where the retail store is located, the wireless detection system configured to wirelessly detect a presence of a first mobile device of a customer of the retail store within the virtual perimeter of the geographic region where the retail store is located;
an electronic database configured to store data representing all existing accounts of customers of the retail store and including an identification of one or more mobile devices associated with one or more of the existing accounts of the customers, the electronic database further storing data representing all pending tasks associated with orders placed by the customers of the existing accounts; and
a processing device communicatively coupled to the wireless detection system and the database, the processing device configured to perform operations comprising:
searching the data stored in the electronic database to determine whether the first mobile device detected by the wireless detection system is stored in the electronic database in association with any existing account;
responsive to determining by the processing device that the first mobile device is associated with an existing first account, searching the electronic database to determine whether there is any data stored in the electronic database indicative of pending task associated with the first account;
responsive to determining, by the processing device, based on a search of the data stored in the electronic database, that there is a pending task associated with the first account, the processing device transmitting a first message to one or more computing devices of staff at the retailer store, the first message notifying the staff at the retail store of the detecting of the presence of the first mobile device associated with the first account within the virtual perimeter of the geographic region where the retail store is located and signaling the staff at the retail store to start preparation for fulfillment of the order;
determining that the first mobile device is at least approximately at a first location of a plurality of predefined locations within the virtual perimeter; and
transmitting information associated with the first location to the one or more computing devices.

14. The system of claim 13, where, in determining that the first mobile device of the customer of the retail store is at least approximately at the first location of the plurality of predefined locations within the virtual perimeter, the processing device is configured to receive a second message from the first mobile device of the customer of the retail store indicating that the first mobile device of the customer of the retail store is at least approximately at the first location.

15. The system of claim 13, where the wireless detection system is configured to perform operations comprising:

tracking a movement of the first mobile device of the customer of the retail store within the virtual perimeter;

determining non-movement of the first mobile device of the customer of the retail store at least approximately at the first location for at least a threshold period of time; and transmitting a result of the determining to the processing device.

16. The system of claim 13, wherein the processing device is further configured to perform operations comprising:

transmitting a signal to the first mobile device of the customer of the retail store to trigger a timer on the first mobile device of the customer of the retail store to count down for a predetermined period of time upon determining that the first mobile device of the customer of the retail store is at least approximately at the first location of the plurality of predefined locations within the virtual perimeter.

17. The system of claim 13, wherein the processing device is further configured to perform operations comprising:

receiving a signal from the wireless detection system indicative of detection of a presence of a second mobile device of a second customer of the retail store within the virtual perimeter of the geographic region;

searching the electronic database to determine that the second mobile device of the second customer of the retail store is associated with a second account;

searching the electronic database to determine that there is no pending task associated with the second account; and transmitting a third message to the one or more computing devices to indicate that there is no pending task associated with the second account.

18. The system of claim 13, wherein the processing device is further configured to perform operations comprising:

searching the electronic database to identify one or more other existing accounts or one or more other mobile devices of other customers of the retail store; and storing in the electronic database an indication that the one or more other existing accounts are associated to the first mobile device of the customer of the retail store or an indication that the one or more other mobile devices of the other customers of the retail store are associated to the first account.

19. The system of claim 13, wherein the processing device is further configured to perform operations comprising:

dynamically defining the virtual perimeter of the geographic region where the retail store is located on a periodic basis or in response to receiving an operator input such that a size of the geographic region within the virtual perimeter at a first time is different from a size of the geographic region within the virtual perimeter at a second time.

* * * * *